Sept. 6, 1932.  A. L. BIRD ET AL  1,876,389
WINDSHIELD HEATER
Filed Jan. 15, 1931
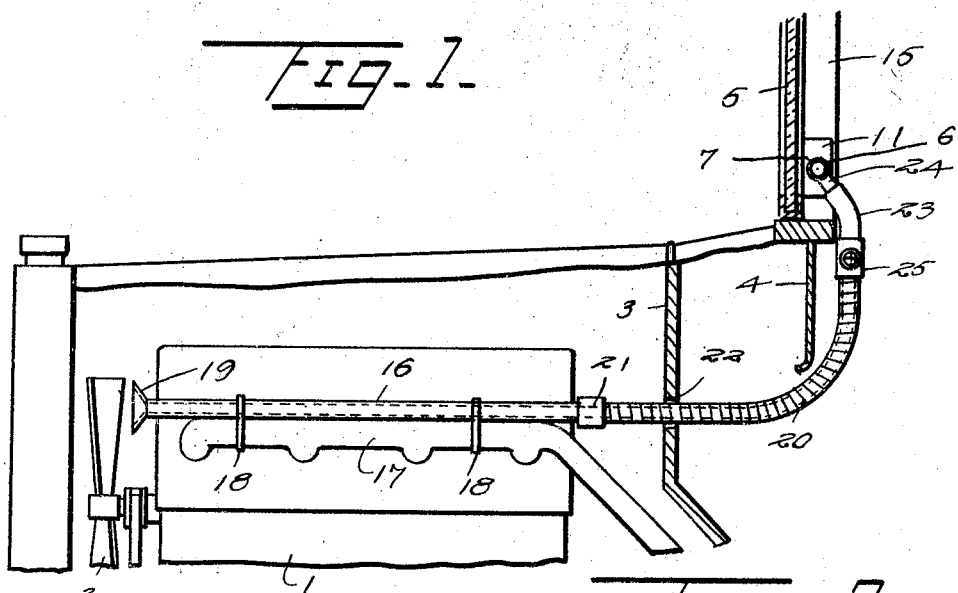
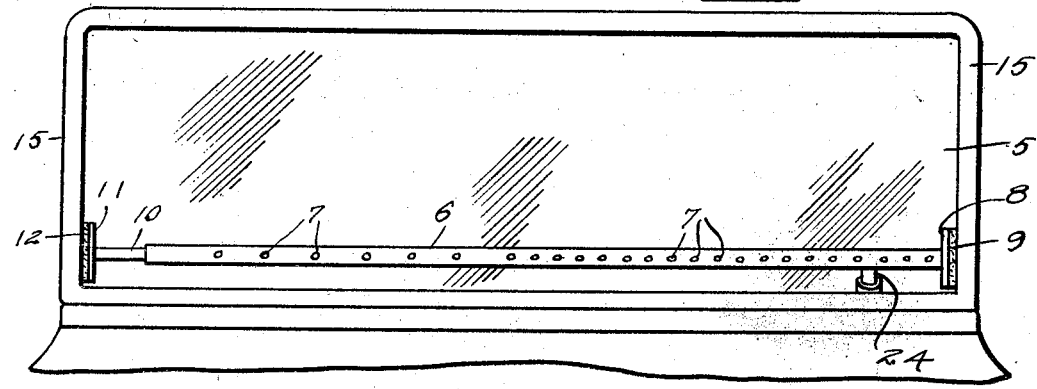
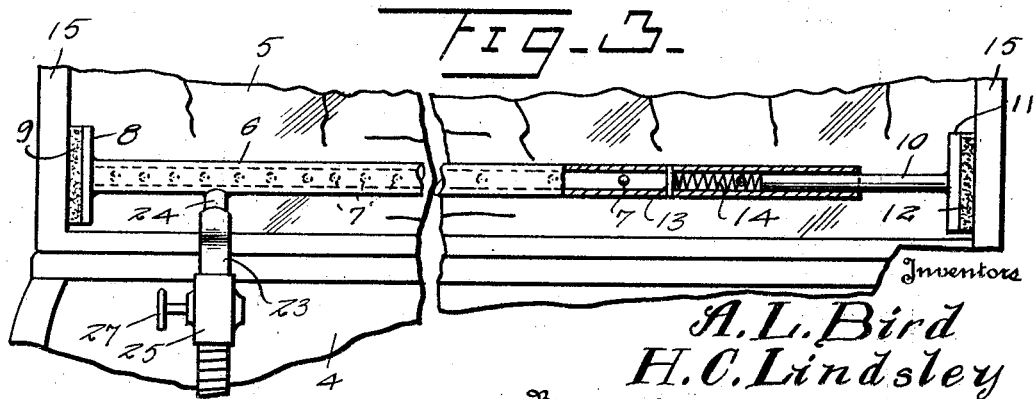
Inventors
A. L. Bird
H. C. Lindsley
By Watson E. Coleman Patented Sept. 6, 1932

1,876,389

UNITED STATES PATENT OFFICE

ARTHUR L. BIRD, OF ORWELL, AND HIRAM C. LINDSLEY, OF BRANDON, VERMONT

WINDSHIELD HEATER

Application filed January 15, 1931. Serial No. 508,982.

This invention relates to automobiles, and has for one of its objects to prevent the formation of frost and the condensing of vapor on the inner sides of the windshields of such vehicles, and to also prevent the accumulation of sleet and snow on the outer sides of the windshields.

To attain the foregoing object, the invention comprehends the provision of novel, simple and inexpensive means which shall be adapted to direct heated air against a windshield in a manner to cause it to flow over the entire inner surface of the windshield with the greater volume thereof flowing over that part of the windshield located directly in front of the driver.

The invention further comprehends the provision of means of the character stated which shall embody an air heater, a tube adapted to receive the air from the heater and direct it against the inner surface of the windshield in the manner stated, and means by which the tube may be secured in applied position easily and quickly and without the aid of screws, clamps or the like.

The invention is hereinafter fully described and claimed, and illustrated in the accompanying drawing, wherein:—

Figure 1 is a view partly in side elevation and partly in vertical section of the front portion of an automobile equipped with a windshield heater constructed in accordance with our invention.

Figure 2 is a view in front elevation of the windshield of the automobile and of the distributing tube of the heater, and Figure 3 is a view in rear elevation of a fragmentary portion of the windshield, the distributing tube and a conduit for conveying air from the heater to the tube, the tube being partly in vertical section.

Referring in detail to the drawing, 1 designates the engine, 2 the fan, 3 the dash, 4 the instrument board, and 5 the windshield of an automobile.

The heater comprises a tube 6 located inwardly or rearwardly of the windshield 5 and extending across the lower portion thereof. The tube 6 is closed at its ends, and is provided in its front side with a longitudinal series of ports 7. The tube 6 is provided at its left hand end with a flange 8 which may be formed integrally therewith or made separately and secured thereto in any suitable manner. A friction element 9 is secured to the outer side of the flange 8, and is by preference made from rubber. A rod 10 is slidably mounted in the right hand end of the tube 6, and is provided at its outer end with a flange 11 which may be formed integrally therewith or made separately and secured thereto in any suitable manner.

A friction element 12 which is also preferably made from rubber, is secured to the outer side of the flange 11. A pin 13 which extends diametrically through the tube 6 and has its ends anchored in the tube, is located in spaced relation to the right hand end of the tube, and constitutes an abutment for one end of a coil spring 14 which bears at its other end against the inner end of the rod 10. The friction elements 9 and 12 contact with the inner lateral sides of the windshield posts 15, and the spring 14, which constantly tends to move the tube 6 and rod 10 axially in opposite directions, holds the friction elements under pressure against the posts, to secure the tube 6 in applied position.

A heating chamber 16 is positioned upon the exhaust manifold 17 of the engine 1. The heating chamber 16 extends longitudinally of the exhaust manifold 17, and is secured in place thereon by clips 18. The heating chamber 16 is provided with an enlarged front or intake end 19 which is of conical formation and arranged rearwardly of and close to the fan 2. A flexible conduit 20 extends from the rear end of the heating chamber 16 to the tube 6, and is secured to the heating chamber by a coupling 21. The conduit 20 passes through an opening 22 in the dash 3, and is connected through the medium of a coupling 23 to a nipple 24 extending downwardly and rearwardly from the tube 6. The nipple 24 is located near the left hand end of the tube 6, and the coupling 23 is provided with a valve 25 of which the stem 26 is provided with a hand wheel 27.

During the operation of the engine 1, air is forced by the fan 2 into the heating chamber 16, the air is conveyed by the conduit 20 from the heating chamber to the distributing tube or nozzle 6, and the air passes from the tube 6 by way of the ports 7. As the heating chamber 16 extends longitudinally of the exhaust manifold 17, and as it is in direct contact for substantially its entire length with the exhaust manifold, the air passing through the chamber will be heated to a high degree, and the heated air will issue from the ports 7 of the distributing tube 6 in the form of fine streams. As the distributing tube 6 is located near the lower edge of the rear surface of the windshield 5, and as it extends substantially throughout the entire length of the windshield, the streams of heated air will strike such surface and flow upwardly and contact therewith, to the end that the entire windshield will be heated sufficiently to prevent the formation of frost and the condensing of vapor on the inner surface thereof, and to also prevent the accumulation of sleet and snow on the outer surface thereof. The ports 7 extend substantially throughout the entire length of the distributing tube 6, the employment of a pin as an abutment for the spring 14 permits the extension of the ports 7 to the right of the abutment, and the rod 10 has a snug fit in the right hand end of the distributing tube so as to prevent the escape of the heated air through such end of the tube. The left hand portion of the distributing tube 6 is provided with a greater number of the ports 7 than the right hand portion of the distributing tube, so as to cause the greater volume of the heated air to be directed against that portion of the windshield 5 located directly in front of the driver, and thus insure for him a clear vision at all times.

The means for securing the distributing tube 6 in applied position, which means comprises the flanges 8 and 11 and their friction elements 9 and 12, the rod 10 and the spring 14, permits the distributing tube to be easily and quickly secured to windshields of different lengths, and furthermore permits the distributing tube to be secured in applied position without the aid of screws, clamps or the like. The valve 25 permits the volume of heated air delivered to the distributing tube 6 to be regulated and controlled and also permits the supply of heated air to the distributing tube to be cut off. Instead of employing the exhaust manifold 17 for the purpose of heating the air passing through the chamber 16, an electric or other suitable heating element may be employed, and such element may be arranged within or outside of the chamber.

While we have described the principle of the invention, together with the structure which we now consider the preferred embodiment thereof, it is to be understood that the structure shown is merely illustrative and that such changes may be made, when desired, as fall within the scope of the invention as claimed.

What is claimed is:

1. A nozzle as set forth comprising an elongated hollow member having one end thereof open and the other end closed, a laterally extending member secured to the closed end of the member, said hollow member having longitudinally spaced apertures therein, an intake nipple secured to the hollow member and telescoping supporting means engaging the open end of the hollow member and cooperating with said laterally extending member to support the hollow member in suspended relation between a pair of vertical supports.

2. A nozzle as set forth comprising an elongated hollow member having one end thereof provided with a laterally extending supporting member, an intake nipple secured to the hollow member, said hollow member having a plurality of longitudinally spaced apertures telescoping supporting means engaging the opposite end of the hollow member and cooperating with the other supporting member in suspending the hollow member between a pair of vertically disposed supports.

3. A nozzle as set forth comprising an elongated hollow member having a laterally extending supporting means secured to one end thereof, a cushioning member carried by the supporting means, said hollow member having a plurality of longitudinally spaced apertures therein, a nipple secured to the member, a telescoping member engaging the opposite end of the hollow member, a spring secured at one end against movement with respect to the hollow member and engaging the telescoping member for constantly urging said latter member longitudinally and outwardly of the hollow member, a laterally extending supporting means carried by said telescoping means, and a cushioning member secured to said latter named supporting means and cooperating with said first named cushioning means in supporting the hollow member between a pair of spaced supports.

4. A nozzle as set forth comprising an elongated tubular member having a laterally extending supporting means secured to one end thereof and closing said one end, the opposite end of the tube being open, a movable rod mounted for movement in the open end of the tube, a spring mounted within the tube and secured at one end thereof against movement with respect to the tube, the opposite end of the spring engaging the inner end of the rod to constantly urge the rod outwardly, a laterally extending supporting member carried by the outer end of the rod, and a cushioning member carried by the latter named supporting member and coacting with the first named supporting member to suspend the tube between a pair of spaced supports, said tube having a plurality of longitudinally spaced apertures therethrough, and an intake nipple secured to the tube.

In testimony whereof we hereunto affix our signatures.

ARTHUR L. BIRD.
HIRAM C. LINDSLEY.